US010399495B1

(12) United States Patent
Osborne

(10) Patent No.: US 10,399,495 B1
(45) Date of Patent: Sep. 3, 2019

(54) SYSTEMS AND METHODS FOR INDICATING PROXIMITY CONDITIONS FOR A VEHICLE

(71) Applicant: United Services Automobile Association, San Antonio, TX (US)

(72) Inventor: Shane C. Osborne, Marion, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 126 days.

(21) Appl. No.: 14/832,721

(22) Filed: Aug. 21, 2015

Related U.S. Application Data

(60) Provisional application No. 62/046,439, filed on Sep. 5, 2014.

(51) Int. Cl.
*B60Q 9/00* (2006.01)

(52) U.S. Cl.
CPC .................................. *B60Q 9/008* (2013.01)

(58) Field of Classification Search
CPC ........ B60Q 1/305; B60Q 1/346; B60Q 9/006; B60Q 9/008; B60Q 9/007; B60Q 9/00; G01S 13/52; G01S 13/931; G08G 1/017; G08G 1/167
USPC ....... 340/435, 438, 439, 436, 905, 907, 901, 340/904, 465, 426.18, 447, 479, 568.1; 701/301, 36, 32.7, 117, 1; 348/148; 705/4, 14.63
See application file for complete search history.

(56) References Cited

U.S. PATENT DOCUMENTS

| | | | | |
|---|---|---|---|---|
| 5,325,096 A | * | 6/1994 | Pakett | G01S 13/52 342/70 |
| 5,341,344 A | * | 8/1994 | O'Brien | B60Q 9/006 340/904 |
| 5,463,384 A | * | 10/1995 | Juds | B60Q 9/008 340/435 |
| 5,905,457 A | * | 5/1999 | Rashid | G01S 13/931 342/70 |
| 6,211,778 B1 | * | 4/2001 | Reeves | B60Q 9/006 340/435 |
| 6,268,803 B1 | * | 7/2001 | Gunderson | B60Q 9/006 180/168 |
| 6,502,035 B2 | * | 12/2002 | Levine | B60Q 1/346 340/465 |
| 6,606,027 B1 | * | 8/2003 | Reeves | B60Q 9/006 340/435 |
| 7,859,432 B2 | * | 12/2010 | Kim | B60Q 9/008 340/435 |

(Continued)

*Primary Examiner* — Hoi C Lau
(74) *Attorney, Agent, or Firm* — Baker & Hostetler LLP

(57) ABSTRACT

A vehicle telematics device communicates with one or more proximity devices removably attached to a vehicle. The vehicle telematics device detects a direction change of the vehicle and signals for corresponding proximity devices to wake thereby causing the proximity devices to detect proximity of the vehicle with one or more other objects and wirelessly transmit proximity data. The telematics device wirelessly receives the proximity data from the proximity devices and notifies an operator of the vehicle of the close proximity condition between the vehicle and the one or more objects. Notably, the proximity data (including determined close proximity conditions) can be shared with a third party such as an insurance provider, which can adjust insurance rates based on the proximity data.

11 Claims, 3 Drawing Sheets

(56) References Cited

U.S. PATENT DOCUMENTS

| | | | | |
|---|---|---|---|---|
| 2001/0048446 A1* | 12/2001 | Ishida | B60R 1/00 | 345/619 |
| 2002/0180595 A1* | 12/2002 | Flick | B60Q 9/007 | 340/435 |
| 2003/0125854 A1* | 7/2003 | Kawasaki | G07C 5/008 | 701/431 |
| 2003/0184435 A1* | 10/2003 | Boddy | B60Q 9/006 | 340/435 |
| 2004/0046647 A1* | 3/2004 | Reeves | B60Q 9/006 | 340/435 |
| 2005/0024191 A1* | 2/2005 | Boddy | B60Q 1/305 | 340/435 |
| 2005/0099275 A1* | 5/2005 | Kamdar | B60R 25/2009 | 340/426.18 |
| 2007/0088488 A1* | 4/2007 | Reeves | G07C 5/085 | 701/117 |
| 2007/0182527 A1* | 8/2007 | Traylor | B60Q 9/008 | 340/435 |
| 2007/0225872 A1* | 9/2007 | Luebke | G08G 1/017 | 701/1 |
| 2007/0279203 A1* | 12/2007 | Thomas | B60C 23/068 | 340/447 |
| 2008/0079553 A1* | 4/2008 | Boice | B60Q 9/008 | 340/435 |
| 2008/0084283 A1* | 4/2008 | Kalik | B60Q 9/00 | 340/435 |
| 2009/0256698 A1* | 10/2009 | Bonilla | B60Q 1/44 | 340/479 |
| 2010/0194884 A1* | 8/2010 | Plaster | B60R 25/102 | 348/148 |
| 2010/0194885 A1* | 8/2010 | Plaster | B60R 25/10 | 348/148 |
| 2010/0238009 A1* | 9/2010 | Cook | G06Q 10/10 | 340/439 |
| 2010/0289632 A1* | 11/2010 | Seder | G01S 13/723 | 340/436 |
| 2011/0169626 A1* | 7/2011 | Sun | B60Q 9/008 | 340/439 |
| 2011/0193961 A1* | 8/2011 | Peterson | B60R 1/00 | 348/148 |
| 2012/0154591 A1* | 6/2012 | Baur | B60R 1/00 | 348/148 |
| 2013/0271272 A1* | 10/2013 | Dhesi | H04L 63/08 | 340/309.9 |
| 2013/0271275 A1* | 10/2013 | Schalk | H04M 1/72538 | 340/438 |
| 2013/0285796 A1* | 10/2013 | Witkowski | G07C 5/008 | 340/10.1 |
| 2014/0103743 A1* | 4/2014 | Hagen | G07B 15/063 | 307/151 |
| 2014/0139669 A1* | 5/2014 | Petrillo | B60R 1/00 | 348/148 |
| 2014/0167955 A1* | 6/2014 | Mahajan | G08B 21/0269 | 340/539.12 |
| 2014/0266654 A1* | 9/2014 | Parker | B60R 25/00 | 340/426.25 |
| 2014/0305828 A1* | 10/2014 | Salvo | G08B 13/1654 | 206/459.1 |
| 2014/0340240 A1* | 11/2014 | Becker | G08G 1/144 | 340/932.2 |
| 2015/0028995 A1* | 1/2015 | Gautama | B60R 25/406 | 340/5.72 |
| 2015/0054647 A1* | 2/2015 | Edwards | G08B 21/22 | 340/568.1 |
| 2015/0116103 A1* | 4/2015 | Yang | G08B 21/24 | 340/438 |
| 2015/0145694 A1* | 5/2015 | Dupont | G08G 1/167 | 340/903 |
| 2015/0254955 A1* | 9/2015 | Fields | G08B 21/02 | 705/4 |
| 2015/0274074 A1* | 10/2015 | Petrillo | B60R 1/00 | 701/36 |
| 2015/0363830 A1* | 12/2015 | Abuelsaad | G06Q 30/0266 | 705/14.63 |
| 2016/0035223 A1* | 2/2016 | Gutmann | B60W 30/09 | 340/907 |
| 2017/0116851 A1* | 4/2017 | Burke | G08G 1/052 | |

* cited by examiner

SYSTEMS AND METHODS FOR INDICATING PROXIMITY CONDITIONS FOR A VEHICLE

CROSS REFERENCE TO RELATED APPLICATIONS

This application claims priority to U.S. Patent Application Ser. No. 62/046,439 filed Sep. 5, 2014 which is incorporated herein by reference in its entirety.

FIELD OF THE INVENTION

The present invention relates to the field of vehicles, and, more particularly, to vehicle warning systems such as proximity alert systems.

BACKGROUND

Conventional proximity alert systems are employed in various types of vehicles (e.g., cars, trucks, motorcycles, watercraft, etc.) to alert vehicle operators when the vehicle is in close proximity to other objects (e.g., pedestrians, bicyclists, other cars, obstructions, etc.).

Recently, such conventional proximity alert systems are becoming more commonplace as standard features in various vehicles due to improvements to technology, decreases in cost and consumer demand. Typically, the proximity alert systems are integrated or otherwise built into the vehicle. However, retrofitting older vehicles to include proximity alert systems proves cost prohibitive and/or generally requires licensed vehicle professionals to physically mount and integrate the proximity alert system into the existing vehicle hardware/software.

Despite efforts to date, a need still exists for cost effective and easy to install proximity alert systems that can be integrated with both old and new vehicles models/types alike.

SUMMARY

According to one or more embodiments of this disclosure, a proximity indication system is provided. The proximity indication system includes a proximity detection device and a vehicle telematics device or other suitable device. Operatively, the proximity indication device and the vehicle telematics device communicate proximity data and notify a vehicle operator of a proximity condition (e.g., a close proximity between the vehicle and another object/obstruction). Notably, the proximity detection device is mounted to a vehicle, wirelessly communicates, or alternatively, via a single wire connection, with the telematics device and is preferably provided with a power source independent from a vehicle power source, which avoids unnecessarily complex installation and reduces cost. For example, such a device can be included in a license plate mount with a battery, such a replaceable or a battery powered solar cell. Such a low cost system is also adaptable to fit on numerous types of vehicle makes/types.

In certain embodiments, the vehicle telematics device is operable to detect a direction change of a vehicle and signal for a proximity device coupled to the vehicle to wake. For example, the telematics device detects the direction change by monitoring one or more accelerometers, determining if a turn signal for the vehicle is initiated, determine the vehicle is in a certain gear and/or a change in the vehicle gear (e.g., reverse, drive, etc.). Additionally monitored may be the speed and RPM of the vehicle because not all OBD ports indicate what gear the vehicle is engaged with in order to how to turn the system on and off. The proximity device, upon waking, detects proximity of the vehicle with one or more other objects and wirelessly transmits proximity data. The telematics device receives the proximity data from the proximity device and determines when a close proximity condition between the vehicle and one or more objects exists. When the close proximity condition exists, the telematics device notifies an operator of the vehicle.

In certain other embodiments, the telematics device further signals for the proximity device and device for monitoring the vehicle speed/RPM to sleep when the direction change is no longer detected and/or after a predetermined amount of time after the direction change is detected. In turn, the proximity device enters sleep and operates at a reduced level of power. Preferably, the proximity device uses a power source independent or separate from a vehicle power source. For example, such power sources can include rechargeable or renewable energy sources (e.g., energy harvesting technologies, solar cells, disposable/replaceable.). By signaling the proximity device to wake or sleep, the telematics device controls the power usage of the proximity device.

In some embodiments, the telematics device notifies the operator of the vehicle of the close proximity condition by providing a warning to the operator. For example, such warning can include audio alerts, visual displays, and combinations thereof. In such embodiments, the telematics device signals for the onboard vehicle display to display the notification, signals a mobile device to display the notification (e.g., audio, visual, etc.), and/or otherwise trigger additional speaker alarm (e.g., onboard speakers, vehicle speakers, etc.).

In still further embodiments, the telematics device transmits the proximity data to a third party (e.g., an insurance provider). The insurance provider can receive the telematics data at, for example, a third party server, and performs data analytics on the proximity data. Such data analytics can result in behavior modeling, risk analysis, and risk profiling that can ultimately cause an increase or decrease in underwriting liability, insurance rates, etc.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DESCRIPTION OF EXAMPLE EMBODIMENTS

Figure 1:
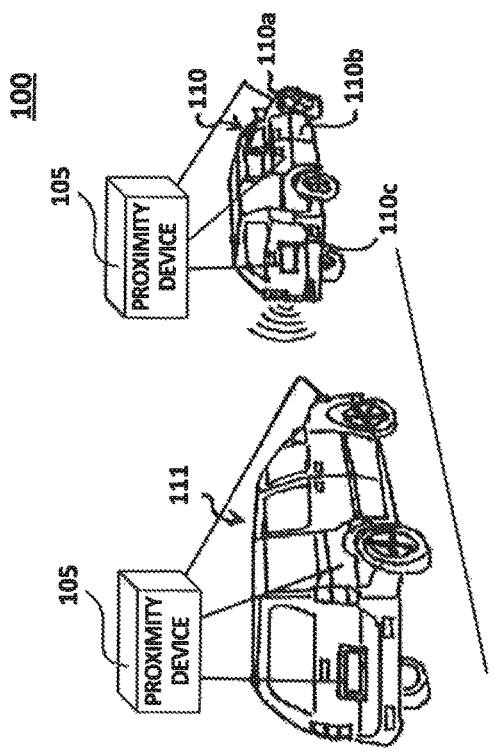
FIG. 1 is an exemplary view of a proximity indication system constructed in accordance with the present disclosure.

Reference will now be made to the drawings wherein for purposes of explanation and illustration, and not limitation, a partial view of an exemplary embodiment of the proximity indication system is shown in FIG. 1 and is generally designated by reference character 100.

Other embodiments of the proximity indication system and proximity indication techniques in accordance with this disclosure, or aspects thereof, are provided in FIGS. 2-4, as will be described in greater detail below. The proximity indication systems and techniques provided herein are low cost, easy to install, and are compatible with a variety of vehicle types. Such systems advantageously indicate to a vehicle operator when the vehicle is in close proximity to one or more other objects (e.g., other vehicles, pedestrians, trash cans, physical structures, and the like).

As shown in FIG. 1, the proximity indication system 100 includes a proximity device 105 that is coupled or mounted to various portions of a vehicle 110. In particular, proximity device 105 is coupled to, for example, a front portion 110a, a side portion 110b, and/or a rear portion 110c of vehicle 110. Preferably, proximity device 105 is releasably mounted by, for example, adhesive, mounting brackets (including license plate brackets/holders), and the like. Operatively, proximity device 105 detects the proximity of vehicle 110 to other objects—here, another vehicle 111. Proximity device 105 detects such proximity by using visual detection, radar detection, electromagnetic detection, etc. However, it is to be understood and appreciated that proximity device 105 is not to be understood to be limited to a device for detecting proximity to an object but rather may encompass any type of sensor device configured to sense/detect a wide array of conditions including temperature, scent, moisture, humidity, wind speed, barometric pressure and the like. Proximity device 105 may also consist of a camera device configured to capture images and/or video.

Additionally, while proximity device 105 is shown as a single device, it is appreciated that any number of proximity device(s) 105 can be deployed in a distributed proximity detecting system and that such view shown in FIG. 1 is for illustration and not limitation.

Figure 2:
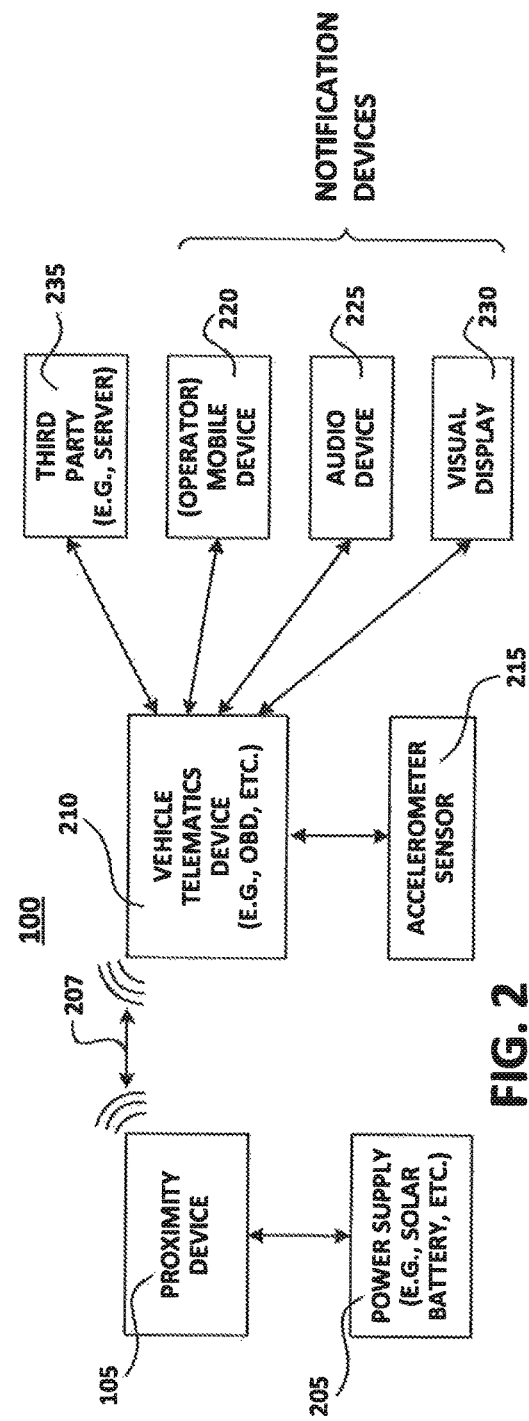
FIG. 2 illustrates a schematic diagram of the proximity indication system including a proximity detection device and a telematics device.

FIG. 2 illustrates additional components of the proximity indication system 100, which includes proximity device 105 (e.g., a sensor device) coupled to a vehicle independent power supply 205. As discussed above, the proximity indication systems and techniques are easy to install and can be employed on various vehicle models and types. Importantly, proximity device 105 includes a power supply 205 that is independent or exclusive from any vehicle power source, which avoids custom modifications to vehicle 110 or components thereof. In one preferred embodiment, proximity device 105 is powered by one or more solar cells (e.g., one or more solar panels), which can be incorporated into corresponding mounting brackets (e.g., a license plate holder, etc.). However, various other embodiments also contemplate other independent power supplies including, but not limited to: batteries and re-chargeable power sources (e.g., energy harvesting sensors/batteries), kinetic energy mini-generator devices, vibration harvesting devices (e.g., a vibration-powered generator) and the like.

Preferably, as shown, proximity device 105 wirelessly communicates with a vehicle telematics device 210. However, it is also appreciated that proximity device 105 may communicate with vehicle telematics device 210 using wired connections. For instance, proximity device (e.g., sensor device) 105 may communicate with a receiving device (e.g., vehicle telematics device) 210 via a single-wire transmission scheme (e.g., a single wire method) 207, as designated in FIG. 2. Briefly, a single wire protocol method consists of transmitting signals from a proximity/sensor device 105 to a receiving device 210 preferably located in a portion of the vehicle (e.g., the cabin) using only a single electrical conductor. In accordance with an illustrated embodiment of FIGS. 1-3, a single wire method/device relies on return current via the chassis (e.g., ground) of the vehicle 100 thus using the vehicle chassis as ground. An example of such a single wire method is the 1-Wire® protocol/device commercially available from Maxim Integrated Products, Inc. In an illustrated embodiment, each single wire proximity/sensor device 105 preferably consists of a low-power device (preferably have a rechargeable energy source) which couples to the chassis of the vehicle 100 for transmitting signals from device 105 to a receiving device 210, wherein receiving device 210 is also coupled to the chassis of the vehicle 100 (e.g., a direct connection or via a power receptacle connection). It is to be appreciated any known means may be used for coupling each device 105 and 210 to the vehicle 100 chassis (e.g., a magnetic connection, screwed/tap connection, induction, etc.). It is to be further appreciated the signal from each single wire device 105 has a unique identifier whereby a vehicle 100 may utilize multiple devices 105 whereby the receiving device 210 is configured to recognize and process a signal from each device 105 via its unique received signal relative to one another. For instance, a unique signal preferably corresponds to a unique alert signal (e.g., audio, video, or both). A noted advantage of a single wire device 105 over a wireless type (as also described above) is that the single wire device 105 is immune from interference with competing wireless signals.

With respect now to the vehicle telematics device 210, it may include, for example: mobile devices, an onboard diagnostics modules (OBD, OBD II, etc.), onboard displays, and the like. Further, vehicle telematics device 210 is shown in communication with an accelerometer sensor 215 as well as various notification devices, including an operator mobile device 220, an audio device 225 and a visual display 230. In certain embodiments, vehicle telematics device 210 is integrated with one or more of the notification devices as well as can include onboard or integrated accelerometers. It is to be appreciated device 210 is not to be understood to be limited to a device having "telematics" functionality but rather may encompass any suitable device configured to recognize and process a signal from each device 105 in accordance with the teaching herein. For instance, device 210 may encompass an independent device, such a cigarette lighter/power adapted configured to receive signals from each device and to alert a vehicle operator (e.g., audibly and/or visually) regarding the proximity of the vehicle to an object.

Additionally, proximity indication system also illustrates the vehicle telematics device 210 communicating with a third party (e.g., a third party server, etc.). As discussed in greater detail below, vehicle telematics device 210 can communicate proximity data (proximity conditions) to a third party such as an insurance provider or an underwriter. Such third party can further perform analytics on the proximity data to determine historical models of operator behavior, develop risk management schedules, adjust insurance rates, facilitate underwriting decisions and the like.

Figure 3:
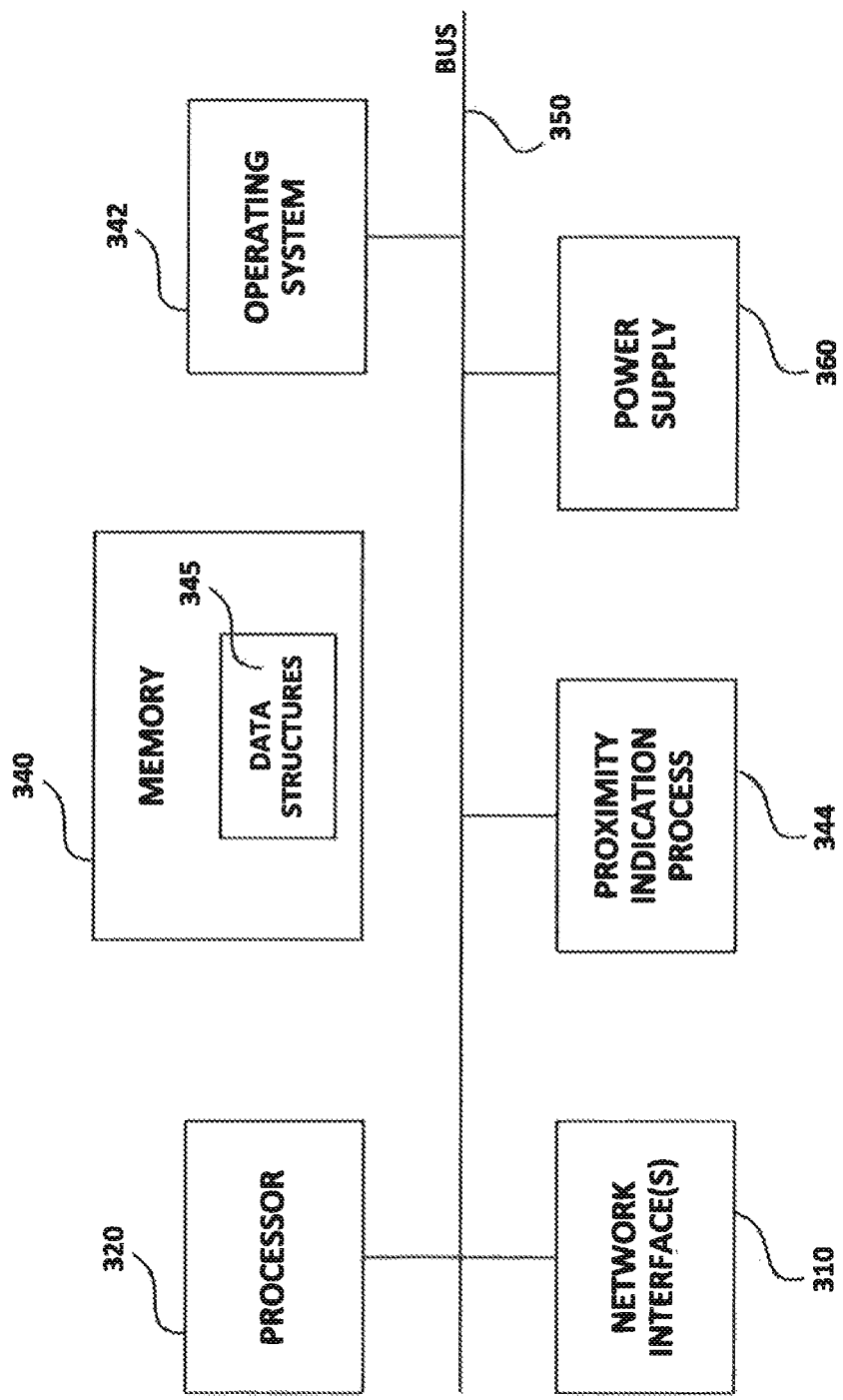
FIG. 3 illustrates an example embodiment of the telematics device, shown in FIG. 2.

FIG. 3 illustrates an example telematics device 300 (e.g., an embodiment of telematics device 210). In certain embodiments, various features and functionality of telematics device 300 (e.g., detecting vehicle direction changes, etc.) can be shared with and/or performed by proximity device 105.

Telematics device 300 may comprise one or more network interfaces 310, at least one processor 320, and a memory 340 interconnected by a system bus 350, as well as a power supply 360 (e.g., battery, plug-in, vehicle power, etc.).

The network interface(s) 310 contain the mechanical, electrical, and signaling circuitry for communicating data such as proximity data (e.g., to/from proximity device 105) over physical and/or wireless links. The network interfaces may be configured to transmit and/or receive data using a variety of different communication protocols, including, inter alia, TCP/IP, UDP, Bluetooth®, a signal wire protocol (e.g., 1-Wire®), wireless protocols (e.g., IEEE Std. 802.15.4, WiFi, Bluetooth®), Ethernet, powerline communication (PLC) protocols, etc. Additionally, telematics device 300 can include more than one type of network connection (e.g., one network connection (wireless) to/from proximity device 105 and other (wired) network connections to notification devices.

The memory 340 comprises a plurality of storage locations that are addressable by the processor 320 and the network interfaces 310 for storing software programs and data structures associated with the embodiments described herein. As noted above, certain devices may have limited memory or no memory (e.g., no memory for storage other than for programs/processes operating on the device). The processor 320 may comprise necessary elements or logic adapted to execute the software programs and manipulate data structures 345, such as predefined proximity limitations. An operating system 342, portions of which are typically resident in memory 340 and executed by the processor, functionally organizes the device by, inter alia, invoking operations in support of software processes and/or services executing on the device. These software processes and/or services may comprise proximity indication process/services 344. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Proximity indication process (services) 344 contains computer executable instructions executed by the processor 320 to perform functions regarding detecting proximity of a corresponding vehicle (i.e., vehicle 110) to one or more objects (i.e., vehicle 111, other obstructions, etc.) and indicating or notifying a vehicle operator of a close proximity condition. Illustratively, the proximity indication techniques described herein may be performed by hardware, software, and/or firmware, such as in accordance with the proximity indication process 344, which may contain computer executable instructions executed by the processor 320 (or independent processor of interfaces 310) to perform functions relating to the techniques described herein.

Operatively, referring collectively to FIGS. 1-3, proximity device 105 is mounted to a portion of vehicle 110 to detect a proximity condition between vehicle 110 and other objects. As discussed above, proximity device can be deployed as a single unit, or may be deployed in a distributed proximity network about vehicle 110. As discussed above, proximity device 105 is typically removably mounted, attached (e.g., magnetically) or otherwise releasably affixed to vehicle 110 and includes an independent power supply (e.g., power supply 205 (FIG. 2), power supply 360 (FIG. 3), etc.). The independent power supply enables remote deployment of proximity device 105 without necessitating conventionally invasive vehicle integration (e.g., splicing into wiring, drilling holes in panels, bumpers, etc.). For example, as discussed above, the independent power supply can include a rechargeable and/or replaceable battery configuration and include harvesting technology (e.g., from kinetic energy from vehicle 110) and/or a solar source (e.g., solar cells/panels, etc.).

Telematics device 210 (e.g., device 300 (FIG. 3)) measures various telematics parameters (e.g., diagnostics, direction changes, vehicle driving data, etc.) regarding vehicle 110. Telematics device 210 includes various types of devices (e.g., mobile devices (mobile phones, other computational devices), OnBoard Diagnostics (OBD, OBDII, etc.), and the like. Telematics device 210 can be hardwired to communicate with vehicle 110 (e.g., OBD, OBDII deployments), or telematics device 210 can wirelessly communicate with vehicle 110 (e.g., mobile device/Bluetooth® deployments). Numerous and various combinations of telematics device 210 are appreciated.

Operatively, as discussed above, telematics device 210 wirelessly communicates with proximity device 105 to detect proximity conditions for vehicle 110. For example, in a preferred embodiment, telematics device 210 signals or instructs proximity device 105 to wake (operate at an increased power level) from sleep (e.g., a reduced or lower power level) to cause proximity device 105 to begin detecting proximity conditions for vehicle 110. Telematics device 210 signals proximity device 105 when a telematics device 210 detects a direction change for vehicle 110. For example, telematics device 210 detects an acceleration change (e.g., by one or more accelerometers), initiation of a signal turn signal (e.g., detecting a blinker of vehicle 110 turns on), speed/RPM change, a vehicle gear change (e.g., a change between driving gears, reverse gears, etc.), and the like. Conversely, telematics device 210 signals proximity device to sleep once the change direction is no longer detected (e.g., after a predetermined period of time, etc.). In this fashion, telematics device 210 causes proximity device 105 to conserve power consumption from its independent power supply 205.

Once proximity device 105 wakes, it executes proximity detection software to detect proximity conditions regarding vehicle 110. For example, referring to FIG. 1, proximity device 105 detects a close proximity condition to vehicle 111 when vehicle 110 attempts to backup or reverse. Likewise, proximity device 105 can detect proximity to other objects, vehicles, obstructions, etc., when vehicle 110 attempts to change lanes, accelerate, and the like. Proximity device 105 wirelessly communicates proximity conditions as proximity data to telematics device 210, which in turn, notifies operators of vehicle 110 when a close proximity condition occurs. For example, telematics device 210 can signal or transmit an alert or notification to the vehicle operator by displaying a warning on mobile device 220, sounding an alarm or speaker (e.g., an onboard speaker, a vehicle speaker, etc.), display a warning or alert on a vehicle visual display (or other display accessible by the vehicle operator), and various combinations thereof.

Notably, with respect to wireless communication between proximity device 105 and vehicle telematics device 210 (and in certain embodiments, with the notification devices or vehicle processor(s)), various wireless technologies and protocols can be used and are readily appreciated by this disclosure (e.g., Bluetooth®, Internet Protocols (IP), LTE, 3GPP, etc.). Those skilled in the art will understand that any number of devices, links, etc. may be used to communicate data to/from/within proximity indication system.

In certain additional embodiments, the proximity data received from the proximity device 105 is also transmitted to a third party 235 (e.g., a third party server). It is to be appreciated transmission may occur via any suitable network connection, including (but not limited to), 3G, LTE, WAN, LAN, Wifi and the like. The third party can include insurance providers or underwriters. These third parties perform analytics on the proximity data and can determine, for example, historical models of operator behavior, determine risk schedules or profiles, and adjust insurance rates. For example, if an operator is consistently operating the vehicle in close proximity conditions, the insurance provider can determine operator is at a higher risk for an accident and may alter the terms of an insurance policy accordingly. Conversely, if an operator tends to consistently avoid close proximity conditions, the operator may be deemed in a lower risk category for an accident, which may decrease insurance rates.

Figure 4:
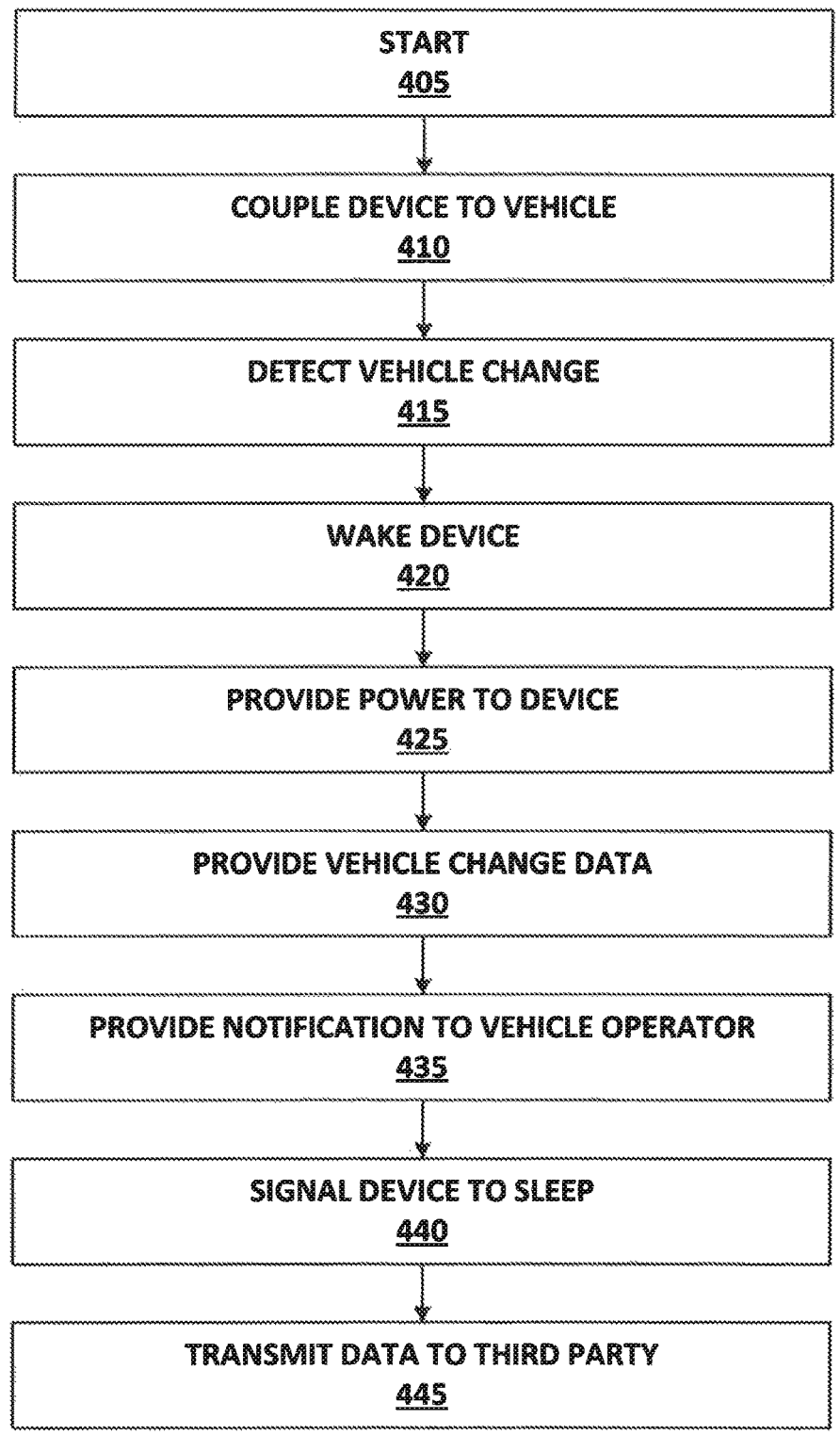
FIG. 4 illustrates an example simplified procedure for indicating proximity conditions for a vehicle.

Turning now to FIG. 4, an example simplified procedure 400 for indicating one or more proximity conditions is provided, in accordance with one or more embodiments described herein and from the perspective of a vehicle telematics device (e.g., telematics device 210).

Procedure 400 begins at step 405 and continues to step 410 where, as discussed above, a proximity device is removably coupled to at least a portion of a vehicle (e.g., a license plate bracket, a side portion of the vehicle, a front portion of the vehicle, etc.). The telematics device, in step 415 detects a direction change for the vehicle (e.g., by an acceleration change, a turn signal (blinker), a vehicle gear change (e.g., reverse), speed/RPM, etc.).

Once the direction change is detected, the telematics device, at step 420, signals for the proximity device to wake (e.g., enter an increased or higher power operation) to detect proximity conditions of the vehicle regarding one or more objects and transmit such proximity conditions as proximity data to the telematics device.

In preferred embodiments, the proximity device includes a power source (e.g., solar panels, batteries, etc.) independent of the vehicle power source(s), as provided in step 425.

The telematics device wirelessly receives, at step 430, the proximity data from the proximity device and at step 435, notifies an operator of the vehicle of any close proximity conditions between the vehicle and one or more objects/obstructions, etc. Such notification includes, for example, displaying a warning on a display (onboard vehicle display, a mobile device display, other displays accessible by the operator, etc.), sounding an audio device (e.g., onboard speakers, vehicle speakers, etc.), and the like.

The telematics device, at step 440, signals for the proximity device to sleep (e.g., operate at a reduced power level) when the telematics device no longer detects the direction change (or after a predetermined time period after initially detecting the direction change).

In certain embodiments, the telematics device transmits the proximity data at step 445 to a third party (e.g., a third party server). The third party can include insurance providers, underwriters and the like. The third party performs data analytics on the proximity data and subsequently adjusts an underwriting liability, an insurance rate, etc., for the operator.

Procedure 400 subsequently ends at step 450, but may continue on to step 415 where, as discussed above, the telematics device detects a direction change for the vehicle.

It should be noted that certain steps within procedure 400 may be optional and that the steps shown in FIG. 4 are merely examples for illustration and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for detecting and indicating proximity conditions of vehicle using a cost efficient and readily adaptable system that can be deployed on various models/makes of vehicles without requiring complex installation. In particular, the techniques herein significantly reduce the amount of vehicle collisions and provide safer driving conditions for all vehicle operators.

While there have been shown and described illustrative embodiments that provide for indicating proximity conditions, it is to be understood that various other adaptations and modifications may be made within the spirit and scope of the embodiments herein. For example, the embodiments have been shown and described herein with relation to and generally from the perspective of the telematics device (e.g., detecting a vehicle direction change, etc.). However, the embodiments in their broader sense are not as limited, and may, in fact, such functionality may be deployed in various other modules or devices (e.g., the proximity detection device can detect direction changes, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for indicating proximity conditions for a vehicle, the method comprising:
   providing power to a proximity device from a power source independent from a vehicle power source, wherein the proximity device utilizes one of a radar or an electromagnetic sensor;
   detecting, by a vehicle telematics device, a direction change of the vehicle;
   signaling, by the vehicle telematics device, for the proximity device coupled to the vehicle to wake in response to the direction change, thereby causing the proximity device to detect proximity of the vehicle with one or more other objects and wirelessly transmit proximity data, wherein the proximity data is transmitted using a unique signal corresponding to the proximity device, wherein the unique signal is distinct from signals corresponding to other proximity devices;

wirelessly receiving, by the vehicle telematics device, the proximity data from the proximity device;

notifying, by the vehicle telematics device, an operator of the vehicle of a close proximity condition between the vehicle and the one or more objects;

recharging the power source using a vibration harvesting device; and signaling, by the vehicle telematics device, for the proximity device to sleep when the vehicle telematics device no longer detects the direction change thereby causing the proximity device to operate at a reduced level of power.

2. The method of claim 1, wherein detecting, by the telematics device, the direction change of the vehicle comprises detecting the direction change of the vehicle by one or more accelerometers in communication with the telematics device.

3. The method of claim 1, wherein detecting, by the telematics device, the direction change of the vehicle comprises detecting the direction change of the vehicle by detecting initiation of a turn signal.

4. The method of claim 1, wherein detecting, by the telematics device, the direction change of the vehicle comprises detecting change of a speed or RPM relating to the vehicle.

5. The method of claim 4, wherein detecting, by the telematics device, the direction change of the vehicle comprises detecting a vehicle gear change, wherein the vehicle gear change includes changing the vehicle into a reverse gear.

6. The method of claim 1, wherein notifying, by the vehicle telematics device, the operator of the vehicle of the close proximity condition comprises signaling one or more speakers to resonate with an alert.

7. A vehicle telematics apparatus, comprising:
one or more network interfaces adapted to wirelessly communicate in a communication network;
a processor adapted to execute one or more processes; and
a memory configured to store a process executable by the processor, the process, when executed by the processor, operable to:
control power usage of an independent power source separate from a vehicle power source by a proximity device, wherein the proximity device utilizes one of a radar or an electromagnetic sensor;
detect initiation of a turn signal of the vehicle;
signal for the proximity device coupled to the vehicle to wake in response to detecting the initiation of the turn signal, thereby causing the proximity device to detect proximity of the vehicle with one or more other objects and wirelessly transmit proximity data, wherein the proximity data is transmitted using a unique signal corresponding to the proximity device, wherein the unique signal is distinct from signals corresponding to other proximity devices;
wirelessly receive the proximity data from the proximity device;
notify an operator of the vehicle of a close proximity condition between the vehicle and the one or more objects;
recharge the independent power source using a kinetic energy mini-generator; and
signal for the proximity device to sleep when the vehicle telematics apparatus no longer detects the turn signal thereby causing the proximity device to operate at a reduced level of power.

8. The vehicle telematics apparatus of claim 7, wherein the process, when executed by the processor to detect a direction change of the vehicle, is further operable to detect the direction change from at least one of an accelerometer in communication with the telematics apparatus, initiation of a turn signal, vehicle gear change, and engagement of a vehicle reverse gear.

9. The vehicle telematics apparatus of claim 7, wherein the process, when executed by the processor to notify the operator of the vehicle of the close proximity condition is further operable to:
provide a warning to the operator by at least one of a mobile device display, an onboard vehicle display, and at least one speaker.

10. The vehicle telematics apparatus of claim 7, wherein the vehicle telematics apparatus comprises at least one of an OBD II device and a mobile phone.

11. The vehicle telematics apparatus of claim 7, wherein the process, when executed by the processor, is further operable to:
transmit the proximity data to a third party server to cause the third party server to perform data analytics on the proximity data and adjust an insurance rate of the vehicle operator based on the data analytics.

* * * * *